(12) United States Patent
Kataoka et al.

(10) Patent No.: US 10,937,177 B2
(45) Date of Patent: Mar. 2, 2021

(54) NON-TRANSITORY COMPUTER READABLE RECORDING MEDIUM, METHOD, AND DEVICE FOR DETERMINING MOVING STATE

(71) Applicant: FUJITSU LIMITED, Kawasaki (JP)

(72) Inventors: Masahiro Kataoka, Kamakura (JP); Hideki Hara, Yokohama (JP); Keisuke Saito, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 112 days.

(21) Appl. No.: 16/255,899

(22) Filed: Jan. 24, 2019

(65) Prior Publication Data
US 2019/0236792 A1 Aug. 1, 2019

(30) Foreign Application Priority Data
Jan. 31, 2018 (JP) .............................. JP2018-015554

(51) Int. Cl.
*G06K 9/00* (2006.01)
*G06T 7/285* (2017.01)
(Continued)

(52) U.S. Cl.
CPC .......... *G06T 7/285* (2017.01); *G06K 9/00805* (2013.01); *G06K 9/00825* (2013.01);
(Continued)

(58) Field of Classification Search
CPC .......... G06K 9/00805; G06K 9/00825; G06K 9/6289; G06T 2207/10021;
(Continued)

(56) References Cited

U.S. PATENT DOCUMENTS

| 2008/0187219 A1* | 8/2008 | Chen ...................... H04N 7/18 382/173 |
| 2017/0091565 A1 | 3/2017 | Yokoi et al. |

(Continued)

FOREIGN PATENT DOCUMENTS

| JP | 2006-338273 | 12/2006 |
| JP | 2008-171141 | 7/2008 |

(Continued)

OTHER PUBLICATIONS

Kryjak, Tomasz, Mateusz Komorkiewicz, and Marek Gorgon. "Real-time foreground object detection combining the PBAS background modelling algorithm and feedback from scene analysis module." International Journal of Electronics and Telecommunications 60.1 (2014): 61-72. (Year: 2014).*

*Primary Examiner* — Nirav G Patel
(74) *Attorney, Agent, or Firm* — Fujitsu Patent Center (57) ABSTRACT

A determination device generates, based on a first captured image captured by a first image capturing device mounted on a moving object, a shape of a subject (one of subjects) included in the first captured image. The determination device estimates the location of the shape of the subject after specific time based on the location of the shape of the subject and a moving speed. The determination device extracts the shape of the subject from a second captured image captured by a second image capturing device mounted on the moving object; compares the location of the shape of the subject extracted from the second captured image with the location of the shape of the subject estimated from the first captured image; and performs determination related to a moving state of the subject.

12 Claims, 9 Drawing Sheets

(51) Int. Cl.
  *G06K 9/62* (2006.01)
  *G06T 7/70* (2017.01)
  *H04N 19/00* (2014.01)

(52) U.S. Cl.
  CPC .............. *G06K 9/6289* (2013.01); *G06T 7/70* (2017.01); *G06T 2207/10021* (2013.01); *G06T 2207/30261* (2013.01); *H04N 19/00* (2013.01)

(58) Field of Classification Search
  CPC . G06T 2207/30252; G06T 2207/30261; G06T 7/285; G06T 7/70; H04N 19/00; H04N 19/23; H04N 19/543; H04N 19/597
  See application file for complete search history.

(56) References Cited

U.S. PATENT DOCUMENTS

2017/0220879 A1   8/2017   Nakamura et al.
2018/0365888 A1*  12/2018  Satzoda ............... G06N 3/0454

FOREIGN PATENT DOCUMENTS

JP   2010-093610   4/2010
JP   2017-068700   4/2017
WO   2016-017272   2/2016

* cited by examiner

| TIME | FIRST CAPTURED IMAGE DATA |
|---|---|
| TIME t1 | FIRST CAPTURED IMAGE DATA CAPTURED AT TIME t1 |
| TIME t2 | FIRST CAPTURED IMAGE DATA CAPTURED AT TIME t2 |
| TIME t3 | FIRST CAPTURED IMAGE DATA CAPTURED AT TIME t3 |
| ... | ... |

| TIME | SECOND CAPTURED IMAGE DATA |
|---|---|
| TIME t1 | SECOND CAPTURED IMAGE DATA CAPTURED AT TIME t1 |
| TIME t2 | SECOND CAPTURED IMAGE DATA CAPTURED AT TIME t2 |
| TIME t3 | SECOND CAPTURED IMAGE DATA CAPTURED AT TIME t3 |
| ... | ... |

FIG.5

| TIME | MOVING SPEED (MOVEMENT VECTOR) |
|---|---|
| TIME t1 | MOVING SPEED OF MOVING OBJECT 5 AT TIME t1 |
| TIME t2 | MOVING SPEED OF MOVING OBJECT 5 AT TIME t2 |
| TIME t3 | MOVING SPEED OF MOVING OBJECT 5 AT TIME t3 |
| ... | ... |

NON-TRANSITORY COMPUTER READABLE RECORDING MEDIUM, METHOD, AND DEVICE FOR DETERMINING MOVING STATE

CROSS-REFERENCE TO RELATED APPLICATION

This application is based upon and claims the benefit of priority of the prior Japanese Patent Application No. 2018-015554, filed on Jan. 31, 2018, the entire contents of which are incorporated herein by reference.

FIELD

The embodiment discussed herein is related to a computer-readable recording medium and the like.

BACKGROUND

Compressing video images captured by video cameras at high compression rate by using a compression technology, such as Moving Picture Experts Group (MPEG), is mainly used for video image compression. Furthermore, in recent years, attempts have been made to apply a technology that is used to analyze video images captured by a car-mounted camera and compressed using MPEG and recognize both static objects, such as roads and signs, included in the video images and dynamic objects, such as the other cars, bikes, or peoples, to an automatic operation of vehicles.

Patent Document 1: Japanese Laid-open Patent Publication No. 2008-171141
Patent Document 2: Japanese Laid-open Patent Publication No. 2006-338273
Patent Document 3: Japanese Laid-open Patent Publication No. 2010-093610
Patent Document 4: Japanese Laid-open Patent Publication No. 2017-068700

SUMMARY

According to an aspect of an embodiment, a non-transitory computer readable recording medium has stored therein a determination program that causes a computer to execute a process including: receiving a first captured image that is captured by a first image capturing device mounted on a moving object and a moving speed of the moving object; extracting a first shape that is a shape of one of subjects included in the first captured image, based on the received first captured image; first specifying a first location that is an estimated appearance location of the first shape in a captured image that is newly captured by the first image capturing device after a specific time has elapsed from when the first captured image was captured, based on the location of the first shape in the first captured image and based on the received moving speed; second specifying a second location that is an appearance location of a second shape associated with the first shape in a second captured image, from among shapes of the subjects included in the received second captured image, when receiving the second captured image captured by a second image capturing device mounted on the moving object after the specific time has elapsed from when the first captured image was captured; and determining whether a moving state is related to the one of the subjects, based on a comparison result between the first location and the second location.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

However, with the conventional technology described above, there is a problem in that it is not possible to distinguish static objects from dynamic objects and extract their shapes with high accuracy.

For example, in a video image captured by a car-mounted camera, because a vehicle moves, not only dynamic objects but also static objects also move. Consequently, in compression performed by using MPEG, encoding is not performed in units of objects and it is thus difficult to distinguish the static objects from the dynamic objects and detect their shapes with high accuracy.

Preferred embodiments of the present invention will be explained with reference to accompanying drawings. Furthermore, the present invention is not limited to the embodiments.

Figure 1:
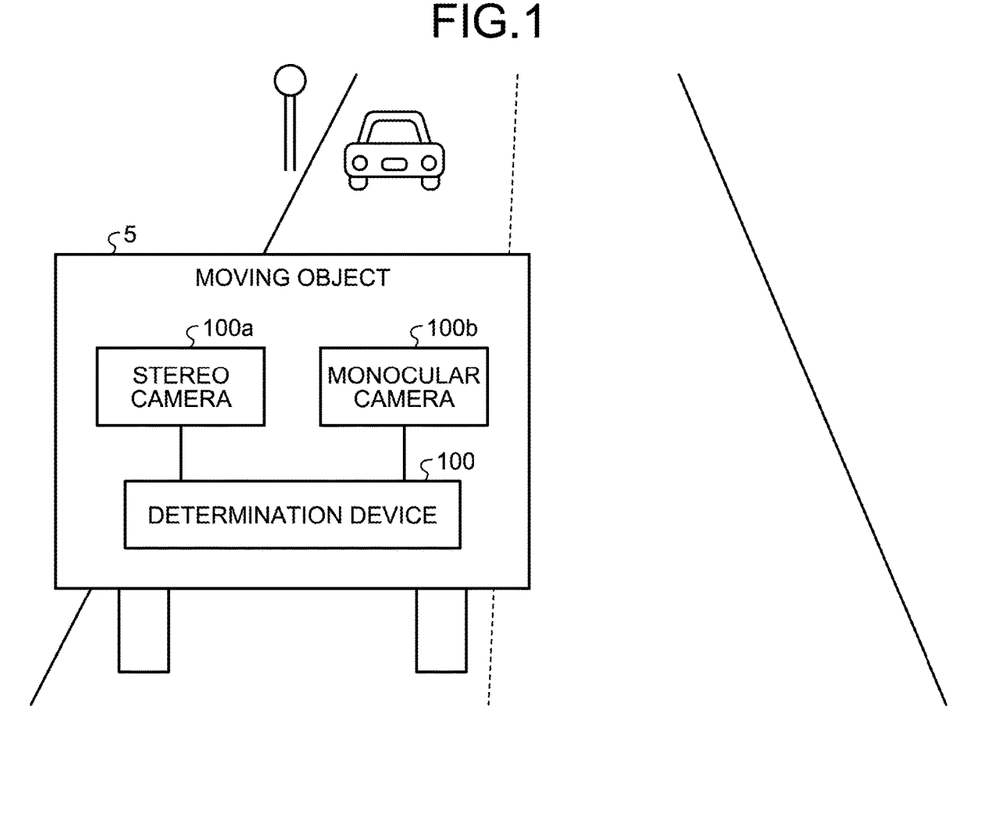
FIG. 1 is a diagram illustrating an example of a system according to an embodiment.

FIG. 1 is a diagram illustrating an example of a system according to an embodiment. As illustrated in FIG. 1, in this system, a stereo camera 100*a*, a monocular camera 100*b*, and a determination device 100 are mounted on a moving object 5. The stereo camera 100*a* and the monocular camera 100*b* are connected to the determination device 100. In the embodiment, a description will be given of a case, as an example, in which the moving object 5 is a vehicle running on a road; however, the example is not limited to the vehicle as long as the moving object 5 is a moving item.

The stereo camera 100*a* is a camera (binocular camera) that simultaneously captures an image of a target objects by two lenses from different directions. The stereo camera 100*a* can actively use parallax based on binocular lenses and extract the distance from a subject and the shape of the subject.

The monocular camera 100b is a camera that captures an image by a single lens.

The determination device 100 is a device that determines, based on the captured image data captured by the stereo camera 100a, the captured image data captured by the monocular camera 100b, and a moving speed (movement vector) of the moving object 5, whether the shape of each of the subjects extracted from the captured image data is the shape of a static object (stationary object) or the shape of a dynamic object.

Figure 2:
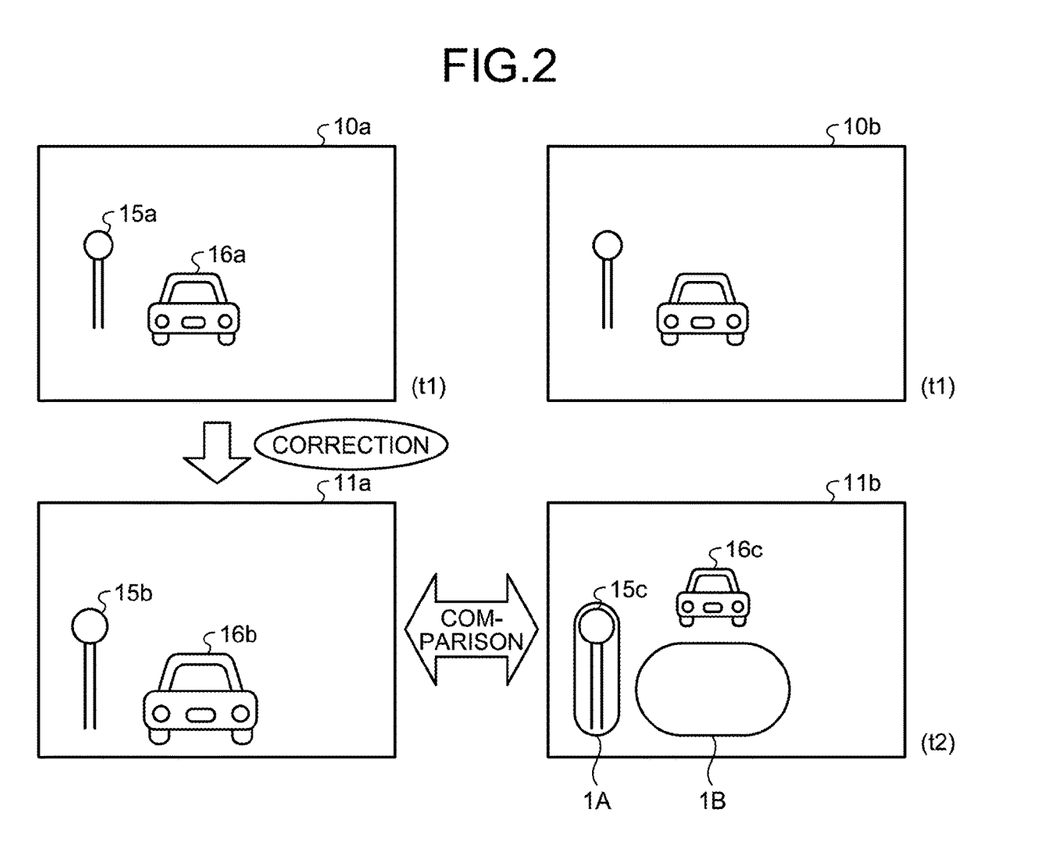
FIG. 2 is a diagram illustrating a process performed by a determination device according to the embodiment.

FIG. 2 is a diagram illustrating a process performed by a determination device according to the embodiment. For example, in FIG. 2, it is assumed that captured image data 10a is the captured image data captured by the stereo camera 100a at time t1. It is assumed that captured image data 10b is the captured image data captured by the monocular camera 100b at time t1. Furthermore, it is assumed that captured image data 11b is the captured image data captured by the monocular camera 100b at time t2.

The determination device 100 extracts, based on the principle of stereo matching, the shape of a subject 15a and the shape of a subject 16a included in the captured image data 10a. Furthermore, if a plurality of subjects is present, the determination device 100 extracts one of the subjects. Furthermore, the determination device 100 estimates, assuming that the subject 15a and the subject 16a are static objects, based on information on a moving speed of the moving object 5, a location of each of the subjects 15a and 16a located after elapse of a predetermined time. For example, the determination device 100 estimates the location of the each of the subjects 15a and 16a located after elapse of a predetermined time started from the time at which the image of the captured image data 10a was captured. The location of each of the subjects 15a and 16a to be estimated is the location indicated in the captured image data.

For example, the determination device 100 generates correction image data 11a by estimating, based on the information on the moving speed, the location of the subject 15a and the location of the subject 16a at time t2 and correcting the captured image data 10a. For example, as illustrated in FIG. 2, the location of the shape of the subject 15a is corrected to the location of the shape of a subject 15b. The location of the shape of the subject 16a is corrected to the location of the shape of a subject 16b.

The determination device 100 determines, by comparing the correction image data 11a with the captured image data 11b, whether the subjects 15a and 16a are static objects or dynamic objects. For example, a subject 15c that is associated with the shape of the subject 15b and that is associated with the corrected subject 15a is present in an area 1A of the captured image data 11b. Consequently, the subject 15a that has been assumed to be a static object moves to the expected location and thus the determination device 100 determines that the subject 15a is a static object.

In contrast, a subject 16c that is associated with the shape of the subject 16b and that is associated with the corrected subject 16b is not present in an area 1B in the captured image data 11b. Consequently, the subject 16a that has been assumed to be a static object does not move to the expected location and thus that determination device 100 determines that the subject 16a is a dynamic object.

As described above, the determination device 100 assumes that, based on the moving speed of the moving object 5, the subject extracted from the captured image data 10a captured by the stereo camera 100a is a static object and generates the correction image data 11a by estimating the location of the subject located after elapse of a predetermined time. The determination device 100 compares the correction image data 11a with the captured image data 11b that is obtained after elapse of a predetermined time since an image was actually captured and determines that, if the subject moves as expected, the subject is a static object. Consequently, it is possible to extract the shape of the subject that remains stationary with high accuracy.

Figure 3:
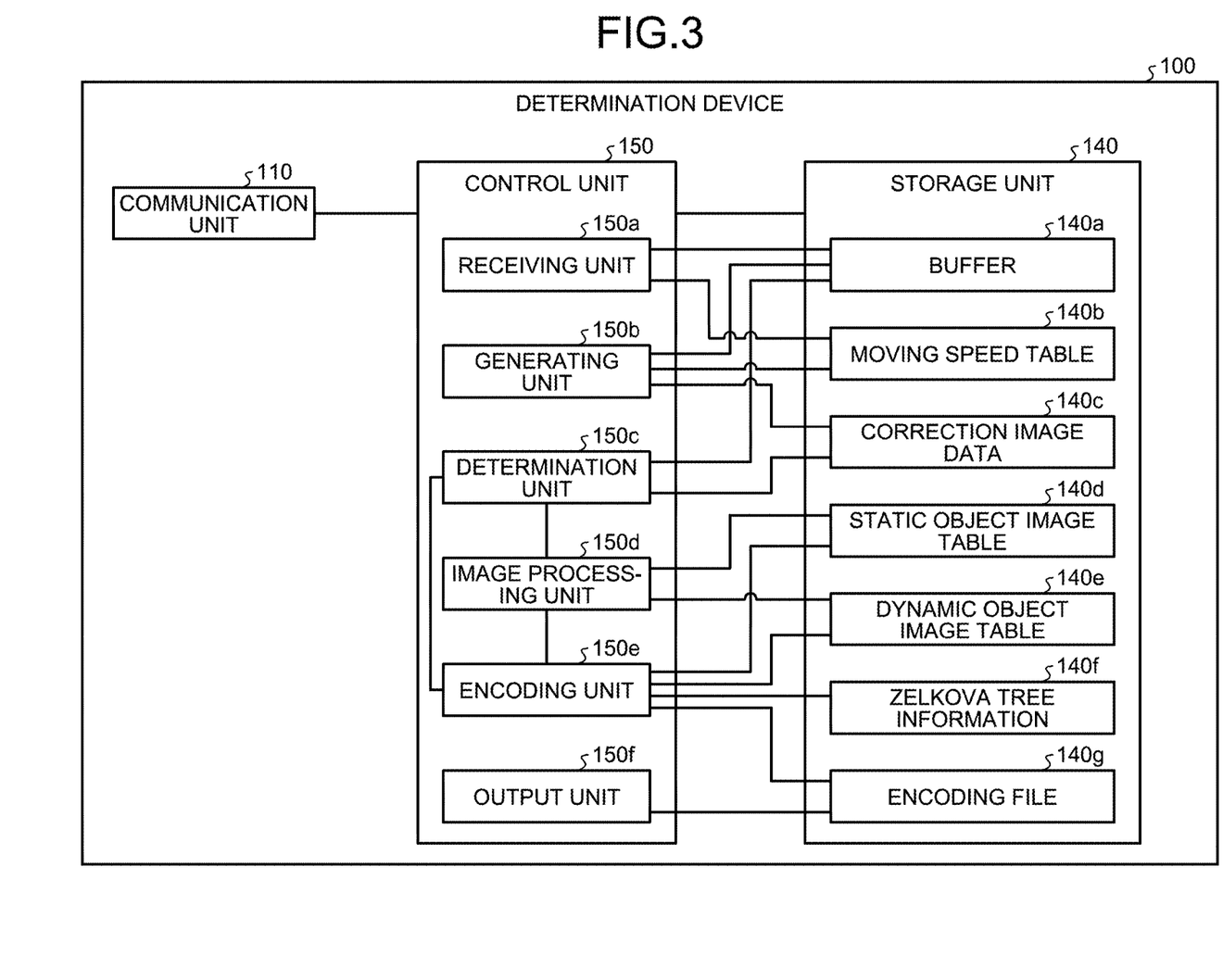
FIG. 3 is a diagram illustrating a configuration of the determination device according to the embodiment.

In the following, an example of a configuration of the determination device according to the embodiment will be described. FIG. 3 is a diagram illustrating a configuration of the determination device according to the embodiment. As illustrated in FIG. 3, the determination device 100 includes a communication unit 110, a storage unit 140, and a control unit 150.

The communication unit 110 is a processing unit that performs data communication between the stereo camera 100a and the monocular camera 100b. The communication unit 110 acquires captured image data captured by the stereo camera 100a. For example, it is assumed that, in the captured image data captured by the stereo camera 100a, a combination of an image of captured image data captured from a first direction and an image of captured image data captured from a second direction that is different from the first direction are included. Furthermore, the communication unit 110 acquires the captured image data captured by the monocular camera 100b. The control unit 150, which will be described later, acquires data from the stereo camera 100a and the monocular camera 100b via the communication unit 110.

Furthermore, the communication unit 110 is connected to a speed measurement device (not illustrated) mounted on the moving object 5. The speed measurement device is a device that measures a moving speed (movement vector) of the moving object 5 based on the speed of the moving object 5 and a rudder angle or the like of the steering wheel of the moving object 5. The communication unit 110 acquires information on the moving speed from the speed measurement device.

In a description below, the captured image data acquired from the stereo camera 100a is appropriately referred to as first captured image data and the captured image data acquired from the monocular camera 100b is appropriately referred to as second captured image data.

The storage unit 140 includes a buffer 140a, a moving speed table 140b, correction image data 140c, a static object image table 140d, a dynamic object image table 140e, Zelkova tree information 140f, and an encoding file 140g. The storage unit 140 corresponds to a semiconductor memory device, such as a random access memory (RAM), a read only memory (ROM), and a flash memory, or a storage device, such as a hard disk drive (HDD).

Figure 4:
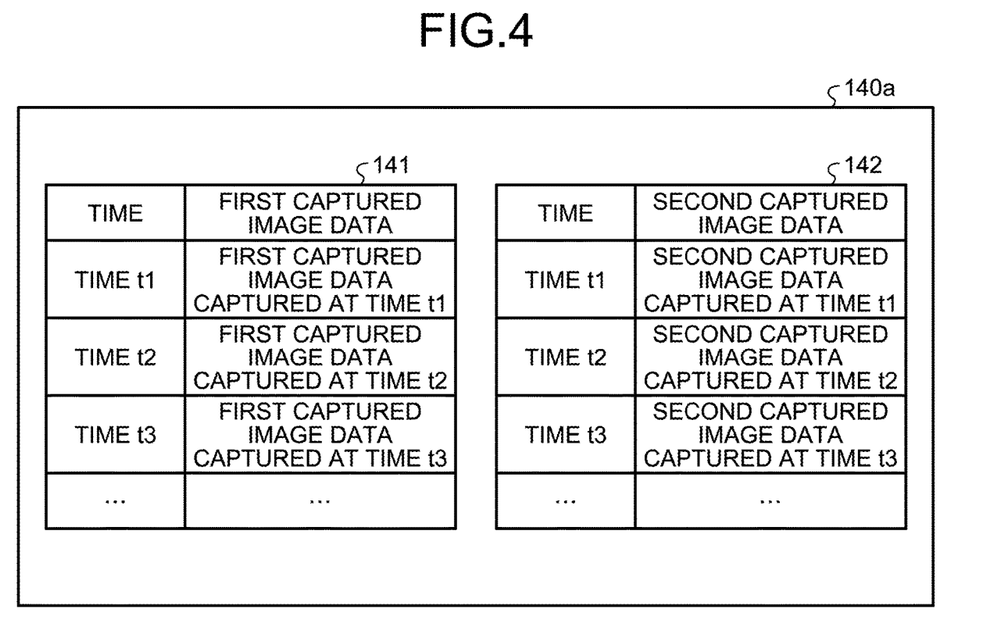
FIG. 4 is a diagram illustrating a data structure of a buffer according to the embodiment.

The buffer 140a is a buffer that holds the first captured image data and the second captured image data. FIG. 4 is a diagram illustrating a data structure of the buffer according to the embodiment. As illustrated in FIG. 4, the buffer 140a includes tables 141 and 142.

The table 141 is a table that holds the time, at which the first captured image data was captured, and the first captured image data in association with each other. The table 142 is a table that holds the time, at which the second captured image data was captured, and the second captured image data in association with each other.

Figure 5:
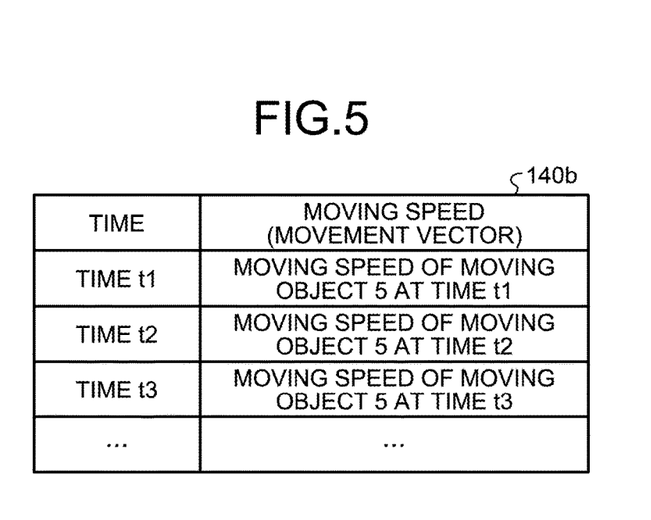
FIG. 5 is a diagram illustrating an example of a data structure of a moving speed table according to the embodiment.

The moving speed table 140b is a table that holds information on a moving speed (movement vector) of the moving object 5 at each time. FIG. 5 is a diagram illustrating an example of the data structure of the moving speed table according to the embodiment. As illustrated in FIG. 5, the moving speed table 140b associates the time with the moving speed of the moving object 5.

The correction image data 140c is image data obtained by correcting, based on the moving speed, the location of the shape of the subject included in the first captured image data captured at time t. For example, the correction image data 140c corresponds to the correction image data 11a described in FIG. 2.

The static object image table 140d is image data that is obtained by removing a dynamic object from the first captured image data. In a description below, the image data that is obtained by removing a dynamic object from the first captured image data is referred to as "static image data". For example, the static object image table 140d holds the time and the static image data in association with each other.

The dynamic object image table 140e is image data that is obtained by removing a static object from the first captured image data image data. In a description below, the image data that is obtained by removing a static object from the first captured image data is referred to as "dynamic image data". For example, the dynamic object image table 140e holds the time and the dynamic image data in association with each other.

In the Zelkova tree information 140f, information in which a code is assigned to a block of the captured image data by using a Zelkova tree (also called a neural tree) is registered.

The encoding file 140g is information that holds encoded captured image data.

The control unit 150 includes a receiving unit 150a, a generating unit 150b, a determination unit 150c, an image processing unit 150d, an encoding unit 150e, and an output unit 150f. The control unit 150 can be implemented by a central processing unit (CPU), a micro processing unit (MPU), or the like. Furthermore, the control unit 150 can also be implemented by hard-wired logic, such as an application specific integrated circuit (ASIC) or a field programmable gate array (FPGA).

The receiving unit 150a acquires the first captured image data from the stereo camera 100a, associates the time with the first captured image data, and registers the association information in the table 141. The receiving unit 150a acquires the second captured image data from the monocular camera 100b, associates the time with the second captured image data, and registers the association information in the table 142.

The receiving unit 150a acquires data on a moving speed from the speed measurement device, associates the time with the moving speed, and registers the association information in the moving speed table 140b.

The generating unit 150b is a processing unit that generates the correction image data 140c based on the first captured image data stored in the table 141 in the buffer 140a and based on the moving speed in the moving speed table 140b. In the following, as an example, a process of generating the correction image data 140c based on the first captured image data obtained at time t will be described.

The generating unit 150b acquires the first captured image data obtained at time t stored in the table 141 and extracts the shape of the subject from the first captured image data. For example, in the first captured image data captured by the stereo camera 100a, a set of the captured image data captured from the first direction and the captured image data captured from the second direction is associated. Furthermore, the first captured image data may also be one of the pieces of captured image data between the captured image data captured by the stereo camera 100a from the first direction and the captured image data captured by the stereo camera 100a from the second direction.

The generating unit 150b specifies, based on the principle of stereo matching, distance between a point on the subject included in the first captured image data and the stereo camera 100a. For example, the generating unit 150b extracts, as the shape of the subject, the area of a point group in which the distance from the stereo camera 100a is less than a predetermined distance. For example, in the example illustrated in FIG. 2, the generating unit 150b extracts, from the first captured image data (the captured image data 10a), the shape of the subject 15a and the shape of the subject 16a. Furthermore, the predetermined distance described above is set to be a focal distance of the stereo camera 100a.

The generating unit 150b performs correction by acquiring the information on the moving speed that is associated with the time t from the moving speed table 140b; estimating, in accordance with the information on the moving speed, the location of the shape of the subject located after elapse of a predetermined time (for example, time t+1); and moving the location of the shape of the subject. Here, the generating unit 150b may also correct the size of the shape of the moved subject by using a predetermined enlargement percentage. For example, in the example illustrated in FIG. 2, the generating unit 150b sets the shape of the subject 15a to the shape of the subject 15b. The generating unit 150b sets the shape of the subject 16a to the shape of the subject 16b.

The generating unit 150b generates the correction image data 140c obtained at time t+1 by correcting the location of the shape of the subject extracted from the first captured image data obtained at time t by using the information on the moving speed described above. For example, in the example illustrated in FIG. 2, the correction image data obtained at time t2 to be generated from the first captured image data (the captured image data 10a) obtained at time t1 becomes the correction image data 11a.

The determination unit 150c is a processing unit that determines, based on the correction image data 140c and based on the second captured image data stored in the table 142 in the buffer 140a, whether the subject included in the first captured image data is a dynamic object or a static object. Here, as an example, a case of determining whether the subject included in the first captured image data obtained at time t is a dynamic object or a static object based on the correction image data 140c and based on the second captured image data obtained at time t+1 will be described.

The determination unit 150c performs edge extraction on the second captured image data and extracts an edge component of the subject. The determination unit 150c specifies the area of the second captured image data associated with the area of the subject of the correction image data 140c. For example, in the example illustrated in FIG. 2, the area of the second captured image data associated with the area of the subject 15b is the area 1A. The area of the second captured image data associated with the area of the subject 16b is the area 1B.

if an edge component that is similar to the shape of the subject associated with the captured image data 10a is included in the specified area, the determination unit 150c determines that the corresponding subject of the first captured image data is a static object. In contrast, if an edge component that is similar to the shape of the subject associated with the captured image data 10a is not included in the specified area, the determination unit 150c determines that the corresponding subject of the first captured image data is a dynamic object.

For example, in the example illustrated in FIG. 2, because the edge component 15c that is associated with the shape of the subject 15b is included in the area 1A, the determination unit 150c determines that the subject 15a is a static object. In contrast, because the edge component that is associated with the shape of the subject 16b is not included in the area 1B, the determination unit 150c determines that the subject 16a is a dynamic object.

The determination unit 150c outputs, to the image processing unit 150d, the information on the location of the shape of the subject that has been determined to be a static object from among the shapes of the subjects included in the first captured image data. In a description below, appropriately, the subject that has been determined to be a static object included in the first captured image data is simply referred to as a static object. Furthermore, the subject that has been determined to be a dynamic object included in the first captured image data is simply referred to as a dynamic object.

Furthermore, the determination unit 150c outputs, to the encoding unit 150e, the information on the location of the shape of the static object included in the first captured image data and the information on the location of the shape of the dynamic object included in the first captured image data.

Figure 6:
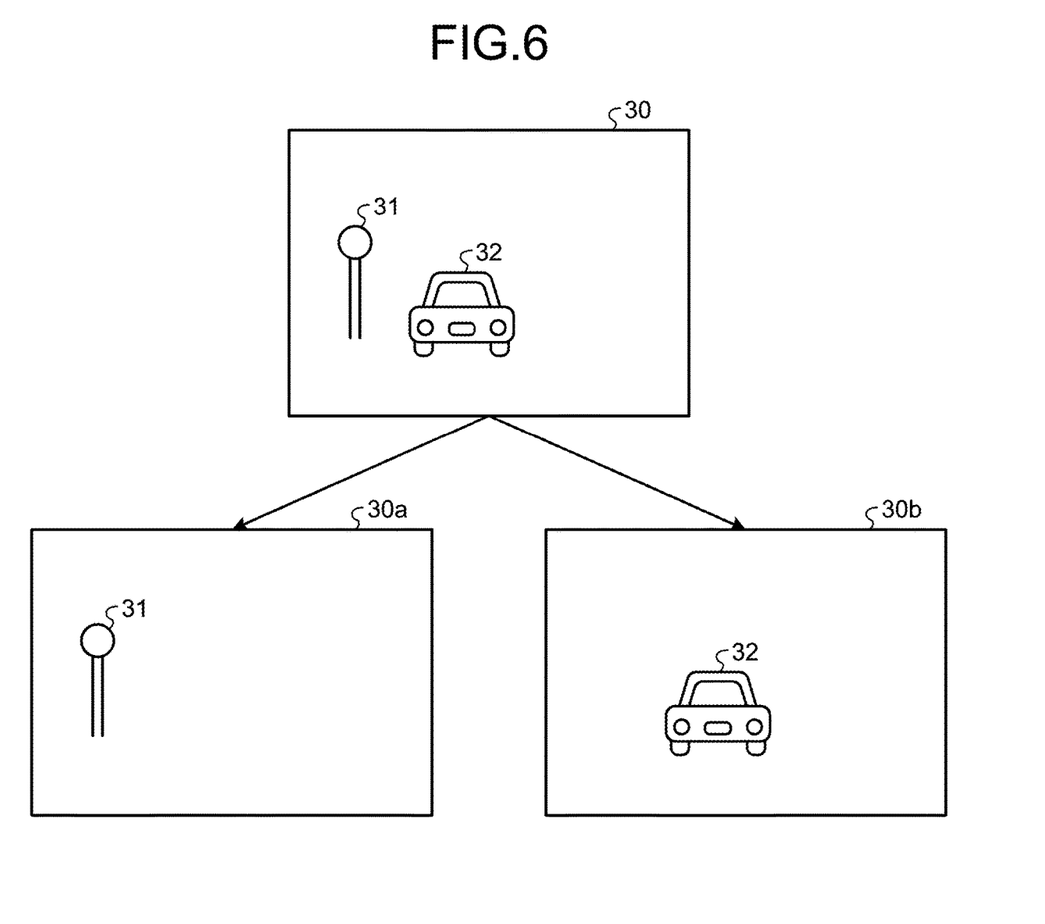
FIG. 6 is a diagram illustrating a process performed by an image processing unit according to the embodiment.

The image processing unit 150d is a processing unit that generates the static image data and the dynamic image data based on the location information on the shape of the static object. FIG. 6 is a diagram illustrating the process performed by the image processing unit according to the embodiment. For example, it is assumed that subjects 31 and 32 is included in first captured image data 30. Furthermore, it is assumed that, based on the location information on the static object acquired from the determination unit 150c, the subject 31 is a static object and the subject 32 is a dynamic object.

For example, the image processing unit 150d generates the static image data by removing, based on the location information on the shape of the static object, the dynamic object between the static object and the dynamic object included in the first captured image data. In FIG. 6, the image processing unit 150d generates static image data 30a by leaving the subject (static object) 31 and by removing the subject (dynamic object) 32. The image processing unit 150d associates the time with the static image data 30a and registers the association information in the static object image table 140d. The time corresponds to the time associated with the first captured image data 30. The image processing unit 150d associates the information on the location of the shape of the static object included in the static image data 30a with the static image data 30a.

The image processing unit 150d generates dynamic image data 30b by leaving the subject (dynamic object) 32 and by removing the subject (static object) 31. The image processing unit 150d associates the time with the dynamic image data 30b and registers the association information in the dynamic object image table 140e. The time corresponds to the time associated with the first captured image data 30.

The encoding unit 150e is a processing unit that encodes the static image data stored in the static object image table 140d and the dynamic image data stored in the dynamic object image table 140e and that stores the encoded information in the encoding file 140g.

Figure 7:
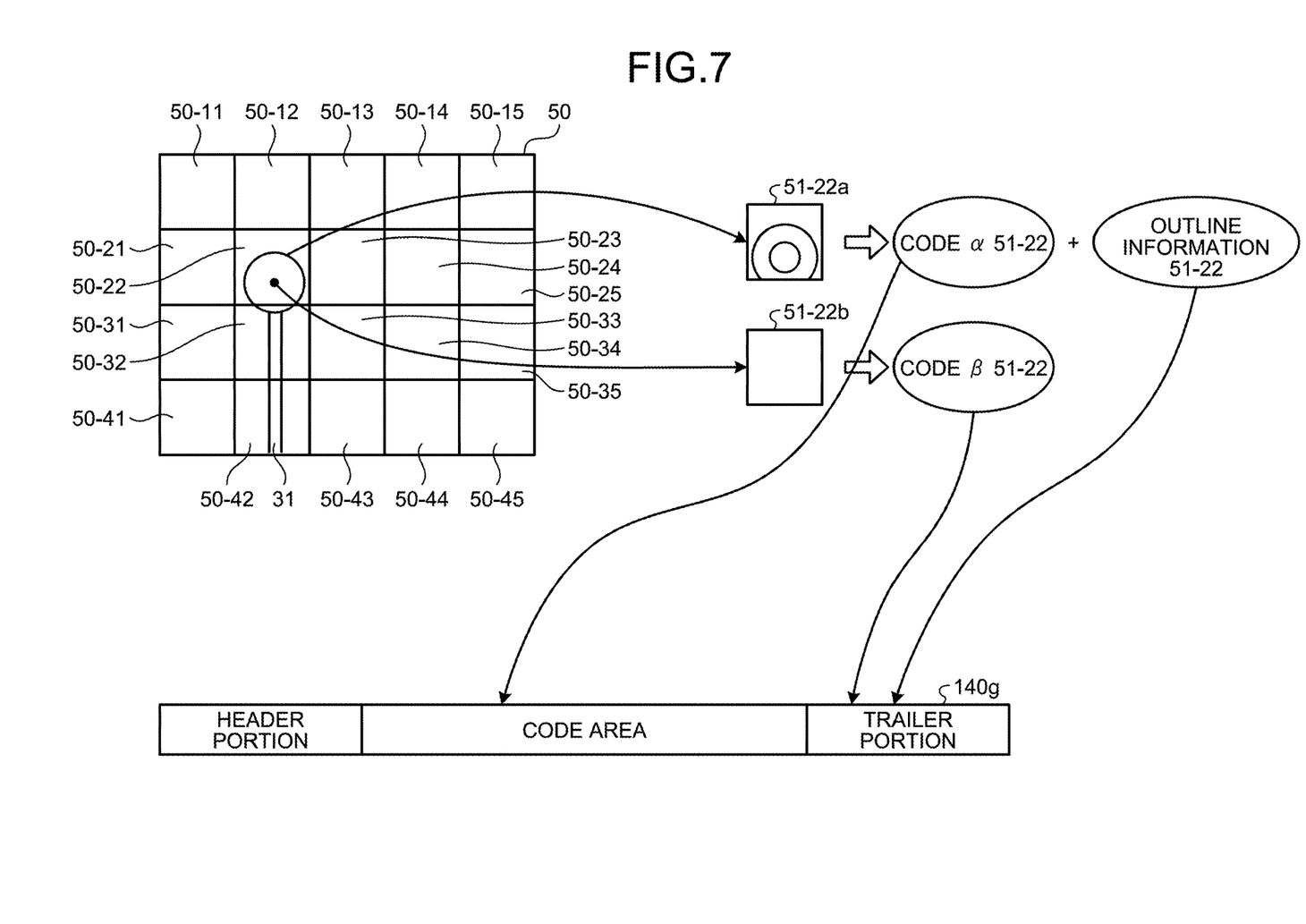
FIG. 7 is a diagram illustrating a process performed by an encoding unit according to the embodiment.

An example of a process in which the encoding unit 150e encodes the static image data will be described. FIG. 7 is a diagram illustrating the process performed by the encoding unit according to the embodiment. In a description in FIG. 7, it is assumed that the subject (static object) 31 is included in static image data 50.

The encoding unit 150e divides the static image data 50 into a plurality of blocks 50-11 to 50-45. The encoding unit 150e specifies, based on the location of the shape of the static object, from among the plurality of the blocks 50-11 to 50-45, the blocks that include the outline of the subject (static object).

In a description below, when particularly distinguishing the blocks, the blocks that include the outline of the subject are referred to as "first type blocks". The blocks that do not include the outline of the target subject are referred to as "second type blocks".

In the example illustrated in FIG. 7, the first type blocks become the blocks 50-22, 50-32, and 50-42. The other blocks that do not correspond to the first type blocks become the second type blocks.

An example of the process in which the encoding unit 150e encodes (compresses) the first type blocks will be described. Here, the process in which the encoding unit 150e encodes the block 50-22 will be described.

The encoding unit 150e generates, based on the block 50-22, front dither image data 51-22a and rear dither image data 51-22b.

The front dither image data 51-22a is image data that includes only the subject 31. For example, the encoding unit 150e generates the front dither image data 51-22a by leaving, in the area of the block 50-22, the area of the subject 31, performing a process of penetrating the other areas, and performing dithering on the processed block 50-22.

The rear dither image data 51-22b is image data that does not include the subject 31. For example, the encoding unit 150e performs a process of excluding, in the area of the block 50-22, the area of the subject 31 and correcting the pixel values in the excluded area with the pixel values of the other area (for example, the area or the background of the subject 31). The encoding unit 150e generates the rear dither image data 51-22b by performing dithering on the processed block 50-22.

The encoding unit 150e assigns a code α51-22 to the front dither image data 51-22a and generates outline information 51-22. For example, the encoding unit 150e selects a single code from among a plurality of unassigned codes α51-n and assigns the selected code to the front dither image data 51-22a. The outline information 51-22 is information that indicates the shape of the outline of the subject 31 included in the front dither image data 51-22a.

Furthermore, the encoding unit 150e assigns a code β51-22 to the rear dither image data 51-22b. For example, the encoding unit 150e selects a single code from among a plurality of unassigned codes β51-n and assigns the selected code to the rear dither image data 51-22b.

The encoding unit 150e registers the information in which the front dither image data 51-22a is associated with the code α51-22 in the Zelkova tree information 140f. The encoding unit 150e registers the information in which the rear dither image data 51-22b is associated with the code β51-22 in the Zelkova tree information 140f.

The encoding unit 150e stores, in the order in which blocks were encoded, the code α51-22 of the front dither image data 51-22a in the code area in the encoding file 140g. As will be described in FIG. 8 later, for example, because the block 51-22a is encoded for the fifth time, the encoding unit 150e stores the code α51-22 in the fifth code area. Furthermore, the encoding unit 150e associates the encoding order, the code β51-22 of the rear dither image data 51-22b, and the outline information and stores the association information in the trailer portion.

The process in which the encoding unit 150e encodes the other first type blocks is the same as the process of encoding the block 50-22 described above. The encoding unit 150e generates, regarding each of the first type blocks, the front dither image data and the rear dither image data; assigns codes; and generates outline information. Furthermore, the encoding unit 150e updates the Zelkova tree information 140f and the information in the encoding file 140g.

In the following, an example of a process in which the encoding unit 150e encodes (compresses) the second type blocks will be described. Here, a process in which the encoding unit 150e encodes the block 50-11 will be described.

The encoding unit 150e generates dither image data 51-11 by performing dithering on the block 50-11 without processing anything. The encoding unit 150e assigns the dither image data 51-11 to the code γ51-11. The encoding unit 150e registers, in the Zelkova tree information 140f, the information in which the dither image data 51-11 is associated with the code γ51-11.

The process in which the encoding unit 150e encodes the other second type blocks is the same as the process of encoding the block 50-11 described above.

Here, the encoding unit 150e characterizes each of the codes such that the codes assigned to the front dither image data in the first type block and the codes assigned to the dither image data in the second type block can be identified. For example, the encoding unit 150e may also unify the top n bits of the code to be assigned to the front dither image data by a predetermined bit string. Alternatively, the encoding unit 150e may also unify the top n bits of the code of the dither image data in the second type block by a predetermined bit string.

The encoding unit 150e encodes, in a manner described above, each of the blocks 50-11 to 50-45 in accordance with a predetermined order that has previously been defined and then sequentially stores the codes and the outline information in the encoding file 140g. For example, the encoding file 140g includes a header portion, a code area, and a trailer portion.

The header portion is an area for storing various kinds of control information. The code area is an area for storing codes of the front dither image data and codes of the dither image data in the second type block. The trailer portion is an area for storing the outline information and the codes of the rear dither image data.

Figure 8:
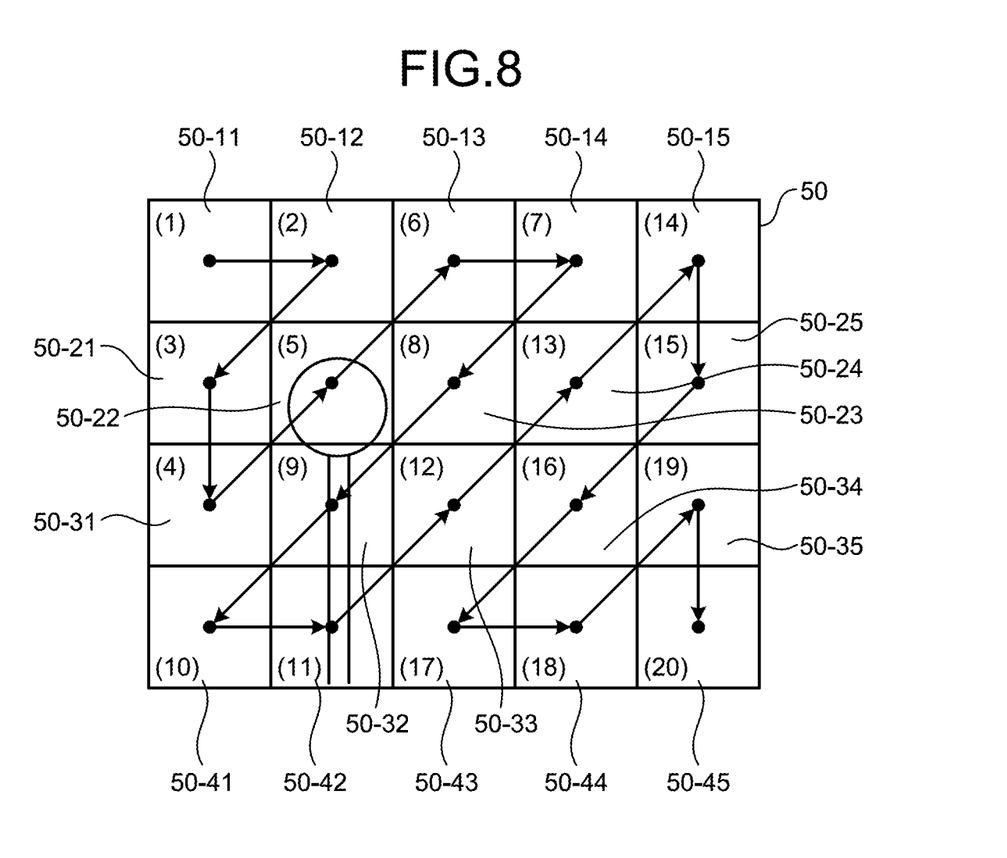
FIG. 8 is a diagram illustrating an example of the order of encoding performed by the encoding unit according to the embodiment.

FIG. 8 is a diagram illustrating an example of the order of encoding performed by the encoding unit according to the embodiment. Each of the blocks is encoded in the order illustrated in FIG. 8 and then the code assigned to each of the blocks is stored in the code area in this order. In the example illustrated in FIG. 8, the encoding unit 150e encodes each of the blocks in the order of zigzag scan. Specifically, the order of the encoding is in the order of the blocks 50-11, 50-12, 50-21, 50-31, 50-22, 50-13, 50-14, 50-23, 50-32, 50-41, 50-42, 50-33, 50-24, 50-15, 50-25, 50-34, 50-43, 50-44, 50-35, and 50-45.

For example, the encoding unit 150e encodes the block (the first type block) 50-22 for the fifth time. Consequently, the encoding unit 150e stores the code α51-22 assigned to the front dither image data associated with the block 50-22 in the fifth area in the code area.

It is assumed that, when the encoding unit 150e stores both the codes of the rear dither image data in the first type block and the outline information in the trailer portion, the encoding unit 150e associates the codes and the outline information with the order in which the corresponding first type blocks were encoded. For example, the block (the first type block) 50-22 is encoded for the fifth time. Consequently, the encoding unit 150e associates the order of "5", the code β51-22 assigned to the rear dither image data, and the outline information 51-22 and then stores the associated information in the trailer portion.

As described above, the encoding unit 150e divides the static image data 50 into a plurality of blocks, scans the blocks in a predetermined order, encodes each of the blocks, and sequentially stores the codes in the code area in the encoding file 140g in the order in which the blocks were encoded. Here, if the blocks targeted for encoding are the first type blocks, the encoding unit 150e performs a process of assigning the codes that can be distinguished from the codes of the second type blocks, associating the outline information on the subject included in the first type block with the order in which the blocks were encoded, and storing the associated information in the trailer portion. Consequently, it is possible to specify the blocks that include the outline of the subject by scanning the code area without decoding the codes stored in the code area and generating the static image data 50 and it is thus possible to easily recycling the outline (outline vector) of the subject by acquiring the outline information associated with the specified blocks from the trailer portion.

In the following, an example of a process in which the encoding unit 150e encodes the dynamic image data will be described. The process of encoding the dynamic image data performed by the encoding unit 150e corresponds to the process of encoding the static image data.

Namely, the encoding unit 150e divides the dynamic image data into a plurality of blocks, scans the blocks in a predetermined order, encodes each of the blocks, and sequentially stores the codes in the code area in the encoding file 140g in the order in which the blocks were encoded. Here, if the blocks targeted for encoding are the first type blocks, the encoding unit 150e performs a process of assigning the codes that can be distinguished from the codes of the second type blocks, associating the outline information on the subject included in the first type blocks with the order in which the blocks were encoded, and storing the associated information in the trailer portion.

Furthermore, it is assumed that the encoding unit 150e distinguishes, in the code area in the encoding file 140g, the area for storing the codes of the static image data from the area for storing the codes of the dynamic image data. It is assumed that the encoding unit 150e distinguishes, in the trailer portion in the encoding file 140g, the area for storing the information on the static image data from the area for storing the information on the dynamic image data.

The output unit 150f is a processing unit that reads the encoding file 140g and that outputs the information in the encoding file 140g to another external device.

Figure 9:
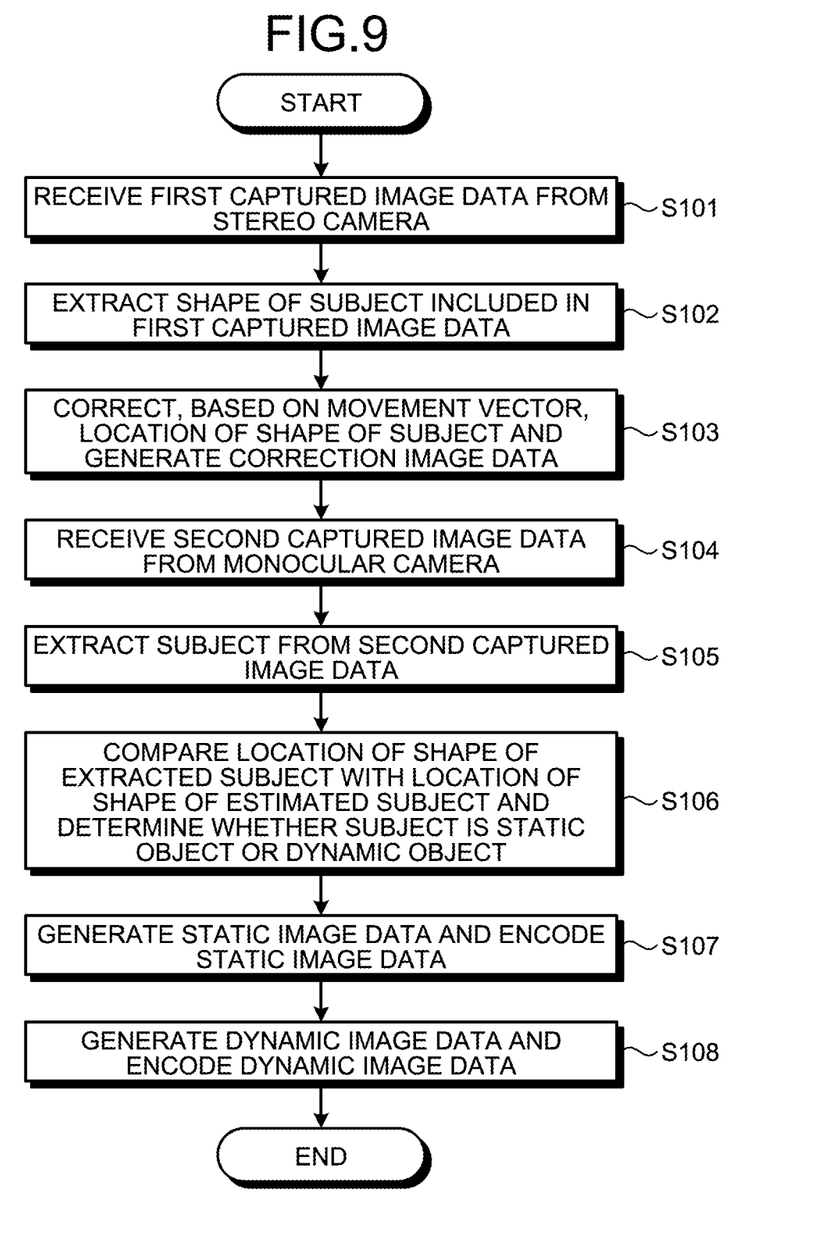
FIG. 9 is a flowchart illustrating the flow of a process performed by the determination device according to the embodiment.

In the following, an example of the flow of a process performed by the determination device 100 according to the embodiment will be described. FIG. 9 is a flowchart illustrating the flow of the process performed by the determination device according to the embodiment. As illustrated in FIG. 9, the receiving unit 150a in the determination device 100 receives the first captured image data from the stereo camera 100a (Step S101).

The generating unit 150b in the determination device 100 extracts the shape of the subject included in the first captured image data (Step S102). The generating unit 150b corrects, based on the movement vector (moving speed), the location of the shape of the subject and generates the correction image data 140c (Step S103).

The receiving unit 150a receives the second captured image data from the monocular camera 100b (Step S104). The determination unit 150c in the determination device 100 extracts the subject from the second captured image data (Step S105).

The determination unit 150c compares the location of the shape of the extracted subject with the location of the shape of the estimated subject and determines whether the subject is a static object or a dynamic object (Step S106).

The image processing unit 150d in the determination device 100 generates static image data by removing the dynamic object between the static object and the dynamic object included in the first captured image data and the encoding unit 150e in the determination device 100 encodes the static image data (Step S107).

The image processing unit 150d generates the dynamic image data by removing the static object between the static object and the dynamic object included in the first captured image data and the encoding unit 150e encodes the dynamic image data (Step S108).

In the following, the effects of the determination device 100 according to the embodiment will be described. The determination device 100 generates the correction image data 140c in which the location of the subject located after elapse of a predetermined time by assuming that, based on the moving speed of the moving object 5, the subject extracted from the captured image data obtained by the stereo camera 100a is a static object. The determination device 100 compares the correction image data 140c with the second captured image data obtained after elapse of a predetermined time since the actual capturing time and then determines that, if the subject is moved as expected, the subject is a static object. Consequently, it is possible to distinguish a static object from a dynamic object and extract each of the shapes thereof with high accuracy.

The determination device 100 generates, in the subject included in the first captured image, the shape of the subject that is present at the location from the stereo camera 100a by a specific distance. For example, if a characteristic distance is a focal length of the stereo camera 100a, it is possible to detect the distance between the stereo camera 100a and the subject with high accuracy and, consequently, it is possible to detect the shape of the subject with high accuracy.

The determination device 100 associates the information on the shape of the subject that has been determined to be a static object with the location of the shape of the subject and stores the associated information in the static object image table 140d in the storage unit 140. Consequently, from among the subjects captured by the stereo camera 100a, it is possible to register only the location information on the shape of the static objects. By using the location information on the shape of the static objects, this makes it possible to generate map information or to use for an automatic operation technology.

In the above explanation, regarding the determination device 100, for the purpose of convenience, a description has been given of the configuration of a combination of the stereo camera 100a and the monocular camera 100b; however, it is possible to alternatively use a configuration of a combination of the monocular camera 100b and the monocular camera 100c (not shown). If a moving object, such as a vehicle, is standing still, it is not able to extract the shape, such as the outline, of a static object or an immobile dynamic object by only using the monocular camera 100b; however, it is possible to extract the shape by using the monocular camera 100b and the monocular camera 100c in combination. Furthermore, if the moving object start moving, because it is possible to extract the outline of the object by using the monocular camera 100b, by separating the monocular camera 100b from the monocular camera 100c and distinguishing, based on each of the images, a static object from a dynamic object, it is possible to extract each of the shapes.

Figure 10:
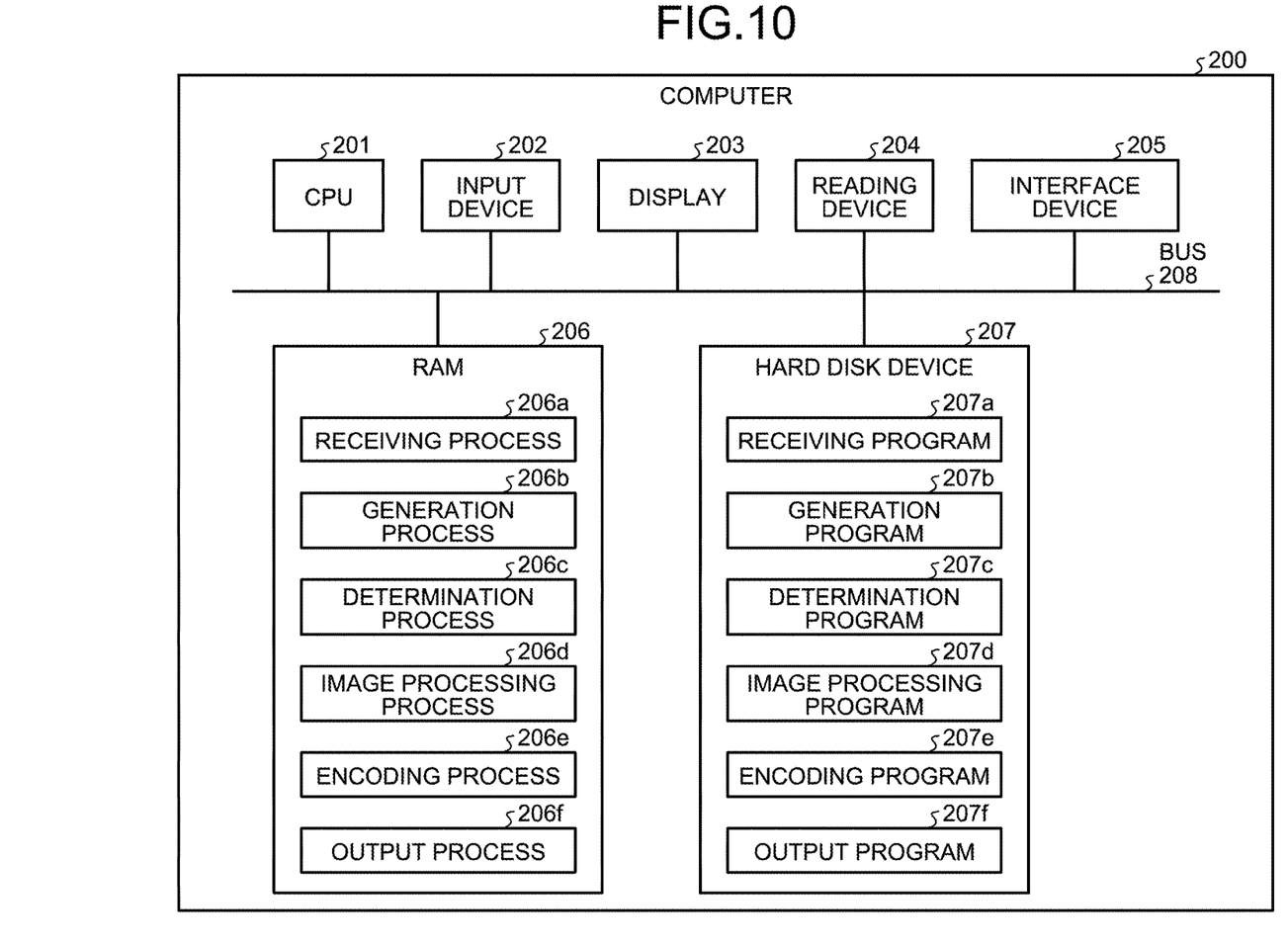
FIG. 10 is a diagram illustrating an example of a hardware configuration of a computer that implements the same function as that performed by the determination device.

In the following, a description will be given of an example of a hardware configuration of a computer that implements the same function as that performed by the determination device 100 described above in the embodiment. FIG. 10 is a diagram illustrating an example of a hardware configuration of a computer that implements the same function as that performed by the determination device.

As illustrated in FIG. 10, a computer 200 includes a CPU 201 that executes various kinds arithmetic processing, an input device 202 that receives an input of data from a user, and a display 203. Furthermore, the computer 200 includes a reading device 204 that reads programs or the like from a storage medium and an interface device 205 that sends and receives data to and from the stereo camera 100a and the monocular camera 100b via a wired or wireless network. Furthermore, the computer 200 includes a RAM 206 that temporarily stores therein various kinds of information and a hard disk device 207. Each of the devices 201 to 207 is connected to a bus 208.

The hard disk device 207 includes a receiving program 207a, a generation program 207b, a determination program 207c, an image processing program 207d, an encoding program 207e, and an output program 207f. The CPU 201 reads each of the programs 207a to 207f and loads the programs 207a to 207f in the RAM 206.

The receiving program 207a functions as a receiving process 206a. The generation program 207b functions as a generation process 206b. The determination program 207c functions as a determination process 206c. The image processing program 207d functions as an image processing process 206d. The encoding program 207e functions as an encoding process 206e. The output program 207f functions as an output process 206f.

The process of the receiving process 206a corresponds to the process performed by the receiving unit 150a. The process of the generation process 206b corresponds to the process performed by the generating unit 150b. The process of the determination process 206c corresponds to the process performed by the determination unit 150c. The process of the image processing process 206d corresponds to the process performed by the image processing unit 150d. The process of the encoding process 206e corresponds to the process performed by the encoding unit 150e. The process of the output process 206f corresponds to the process performed by the output unit 150f.

Furthermore, each of the programs 207a to 207f does not need to be stored in the hard disk device 207 in advance from the beginning. For example, each of the programs is stored in a "portable physical medium", such as a flexible disk (FD), a CD-ROM, a DVD disk, a magneto-optic disk, an IC CARD, that is to be inserted into the computer 200. Then, the computer 200 may also read each of the programs 207a to 207f from the portable physical medium and execute the programs.

It is possible to distinguish static objects and dynamic objects and extract each of the shapes with high accuracy.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer readable recording medium having stored therein a determination program that causes a computer to execute a process comprising:
    receiving a first captured image that is captured by a first image capturing device mounted on a moving object and a moving speed of the moving object;
    extracting a first shape that is a shape of one of subjects included in the first captured image, based on the received first captured image;
    first specifying a first location that is an estimated appearance location of the first shape in a captured image that is newly captured by the first image capturing device after a specific time has elapsed from when the first captured image was captured, based on the location of the first shape in the first captured image and based on the received moving speed;
    second specifying a second location that is an appearance location of a second shape associated with the first shape in a second captured image, from among shapes of the subjects included in the received second captured image, when receiving the second captured image captured by a second image capturing device mounted on the moving object after the specific time has elapsed from when the first captured image was captured; and
    determining whether a moving state is related to the one of the subjects, based on a comparison result whether a second edge component is similar to a first edge component, the first edge component being associated with the shape of the subject in the first location specified at the first specifying, the second edge component being associated with the shape of the subject in the second location specified at the second specifying, wherein
    the determining determines that, when the second edge component is associated with the first edge component, the one of the subjects at the first location is a stationary object.

2. The non-transitory computer readable recording medium according to claim 1, wherein the first specifying specifies the first location after elapse of the specific time assuming that, based on the location of the first shape in the first captured image and based on the moving speed, the one of the subjects is a stationary object.

3. The non-transitory computer readable recording medium according to claim 1, wherein
    the first image capturing device is a stereo camera, and
    the extracting extracts the shape of the subject as the first shape, from among the subjects included in the first captured image, that is present at the location away from the first image capturing device by a specific distance.

4. The non-transitory computer readable recording medium according to claim 1, the process further comprising storing, in a storage unit in association with the first location, information on the first shape of the one of the subjects that has been determined to be the stationary object.

5. A determination method comprising:
    receiving a first captured image that is captured by a first image capturing device mounted on a moving object and a moving speed of the moving object, using a processor;
    extracting a first shape that is a shape of one of subjects included in the first captured image, based on the received first captured image, using the processor;
    first specifying a first location that is an estimated appearance location of the first shape in a captured image that is newly captured by the first image capturing device after a specific time has elapsed from when the first captured image was captured, based on the location of the first shape in the first captured image and based on the received moving speed, using the processor;
    second specifying a second location that is an appearance location of a second shape associated with the first shape in a second captured image, from among shapes of the subjects included in the received second captured image, when receiving the second captured image captured by a second image capturing device mounted on the moving object after the specific time has elapsed from when the first captured image was captured, using the processor; and
    determining whether a moving state is related to the one of the subjects, based on a comparison result whether a second edge component is similar to a first edge component, the first edge component being associated with the shape of the subject in the first location specified at the first specifying, the second edge component being associated with the shape of the subject in the second location specified at the second specifying, using the processor, wherein
    the determining determines that, when the second edge component is associated with the first edge component, the one of the subjects at the first location is a stationary object.

6. The determination method according to claim 5, wherein the first specifying specifies the first location after elapse of the specific time assuming that, based on the location of the first shape in the first captured image and based on the moving speed, the one of the subjects is a stationary object.

7. The determination method according to 5, wherein
    the first image capturing device is a stereo camera, and
    the extracting extracts the shape of the subject as the first shape, from among the subjects included in the first captured image, that is present at the location away from the first image capturing device by a specific distance.

8. The determination method according to claim 5, the process further comprising storing, in a storage unit in association with the first location, information on the first shape of the one of the subjects that has been determined to be the stationary object.

9. A determination device comprising:
    a memory; and
    a processor that executes a process comprising:
    receiving a first captured image that is captured by a first image capturing device mounted on a moving object and a moving speed of the moving object;

extracting a first shape that is a shape of one of subjects included in the first captured image, based on the received first captured image;

first specifying a first location that is an estimated appearance location of the first shape in a captured image that is newly captured by the first image capturing device after a specific time has elapsed from when the first captured image was captured, based on the location of the first shape in the first captured image and based on the received moving speed;

second specifying a second location that is an appearance location of a second shape associated with the first shape in a second captured image, from among shapes of the subjects included in the received second captured image, when receiving the second captured image captured by a second image capturing device mounted on the moving object after the specific time has elapsed from when the first captured image was captured; and determining whether a moving state is related to the one of the subjects, based on a comparison result whether a second edge component is similar to a first edge component, the first edge component being associated with the shape of the subject in the first location specified at the first specifying, the second edge component being associated with the shape of the subject in the second location specified at the second specifying, wherein the determining determines that, when the second edge component is associated with the first edge component, the one of the subjects at the first location is a stationary object.

10. The determination device according to claim 9, wherein the first specifying specifies the first location after elapse of the specific time assuming that, based on the location of the first shape in the first captured image and based on the moving speed, the one of the subjects is a stationary object.

11. The determination device according to claim 9 wherein the first image capturing device is a stereo camera, and the extracting extracts the shape of the subject as the first shape, from among the subjects included in the first captured image, that is present at the location away from the first image capturing device by a specific distance.

12. The determination device according to claim 9, the process further comprising storing, in the memory in association with the first location, information on the first shape of the one of the subjects that has been determined to be the stationary object.

* * * * *